(12) United States Patent
Chopra et al.

(10) Patent No.: US 7,649,675 B2
(45) Date of Patent: Jan. 19, 2010

(54) TONER COMPOSITIONS FOR DRY-POWDER ELECTROPHORETIC DISPLAYS

(75) Inventors: Naveen Chopra, Oakville (CA); Valerie M. Farrugia, Oakville (CA); Jurgen Daniel, Mountain View, CA (US); Raj D. Patel, Oakville (CA); Man-Chung Tam, Mississauga (CA); Meng H. Lean, Santa Clara, CA (US)

(73) Assignee: Palo Alto Research Center Incorporated

( * ) Notice: Subject to any disclaimer, the term of this patent is extended or adjusted under 35 U.S.C. 154(b) by 0 days.

(21) Appl. No.: 12/367,752

(22) Filed: Feb. 9, 2009

(65) Prior Publication Data

US 2009/0141338 A1 Jun. 4, 2009

Related U.S. Application Data

(62) Division of application No. 10/973,544, filed on Oct. 26, 2004, now Pat. No. 7,499,209.

(51) Int. Cl.
*G02B 26/00* (2006.01)
(52) U.S. Cl. ..................... 359/296; 345/107
(58) Field of Classification Search ............ 359/240, 359/243, 290, 296; 345/107
See application file for complete search history.

(56) References Cited

U.S. PATENT DOCUMENTS

| 4,298,672 | A | 11/1981 | Lu |
| 4,338,390 | A | 7/1982 | Lu |
| 5,278,020 | A | 1/1994 | Grushkin et al. |
| 5,290,654 | A | 3/1994 | Sacripante et al. |
| 5,308,734 | A | 5/1994 | Sacripante et al. |
| 5,344,738 | A | 9/1994 | Kmiecik-Lawrynowicz et al. |
| 5,346,797 | A | 9/1994 | Kmiecik-Lawrynowicz et al. |
| 5,364,729 | A | 11/1994 | Kmiecik-Lawrynowicz et al. |
| 5,370,963 | A | 12/1994 | Patel et al. |
| 5,403,693 | A | 4/1995 | Patel et al. |
| 5,418,180 | A | 5/1995 | Brown |
| 6,395,445 | B1 | 5/2002 | Toth et al. |
| 6,593,049 | B1 | 7/2003 | Veregin et al. |
| 6,756,176 | B2 | 6/2004 | Stegamat et al. |
| 7,136,216 | B1 * | 11/2006 | Daniel et al. ............... 359/296 |
| 2004/0142266 | A1 | 7/2004 | Sacripante et al. |
| 2006/0024437 | A1 | 2/2006 | Pullen et al. |

* cited by examiner

*Primary Examiner*—Timothy J Thompson
(74) *Attorney, Agent, or Firm*—Fay Sharpe LLP

(57) ABSTRACT

Toner particles and a dry-powder electrophoretic display employing such particles are disclosed herein. The toner particles adapted for a dry-powder electrophoretic display comprise emulsion/aggregation particles having a negative charge. At least a portion of the toner particles include a surface coating, comprising a methacrylate polymer, disposed on the surface of the toner particles to impart a positive charge to a set of toner particles. The emulsion/aggregation toner particles have a particle size generally less than about 10 micrometers that allows for improved image quality as compared to conventional toners utilized in dry-powder electrophoretic displays.

33 Claims, 4 Drawing Sheets

TONER COMPOSITIONS FOR DRY-POWDER ELECTROPHORETIC DISPLAYS

This is a divisional of application of U.S. Ser. No. 10/973,544, filed Oct. 26, 2004, entitled "Toner Compositions for Dry-Powder Electrophoretic Displays", by Naveen Chopra et al., the disclosure of which is hereby incorporated by reference in its entirety.

BACKGROUND

The present disclosure relates, in various exemplary embodiments, to toner compositions and processes for producing the same. The present disclosure also relates to dry-powder electrophoretic displays employing such toner compositions.

Photo-electrophoretic imaging systems and electrophoretic displays are known in the art. Electrophoretic imaging systems and displays generally include electrically photosensitive pigment particles dispersed in a carrier liquid, or suspending fluid, and arranged between two parallel and generally transparent conducting electrode panels.

Conventional electrophoretic display systems are typically one of two types, namely, a one particle system or a two particle system. In a one particle system, the suspending fluid is colored with a dye. In a two particle system, two types of particles of different colors and opposite charge are dispersed in a clear fluid. Particles acquire their charge via the adsorption of polymeric charge control agents (CCAs) that are added to the fluid. Under the influence of an electric field, the charged particles migrate towards the oppositely charged electrode.

The particles are typically prepared using a liquid toner process to create composite particles consisting of a pigment and a resin. The particles generally range from about 1 to about 10 micrometers in size. The resin used includes thermoplastics such as a poly(ethylene-co-vinyl acetate) or a poly(ethylene-co-methacrylic acid). The particles are then encapsulated in a microcapsule or a photopolymer structure to produce a display device.

Electrophoretic displays using these liquid systems, however, have a number of drawbacks. In unencapsulated systems, for example, articles that make up the system tend to cluster and settle, which reduces the performance and the life of the electrophoretic display. Encapsulated systems also experience performance problems over time. For example, above 60° C., the polymer becomes soft and sticky, which leads to particle agglomeration and overall degradation in device performance. These problems limit the robustness of the materials packaging, and preclude any device preparation steps, such as hot lamination. Additionally, the desorption of charge control agents from the particles in the solution leads to decay of the electrophoretic mobility of the particles.

As an alternative to conventional electrophoretic displays utilizing liquid systems, there is a growing interest in dry-powder electrophoretic displays. Dry-powder electrophoretic displays as used herein refers to electrophoretic displays wherein the toner particles are not dispersed in a suspending fluid or encapsulated as is understood in the art. Dry-power electrophoretic displays offer advantages over conventional liquid electrophoretic systems. An important aspect is that the solventless nature of the dry-powder display greatly reduces the loss of particle charge over time. Additionally, known dry-powder electrophoretic displays are typically limited by the size of the toner particles, i.e., up to about 50 micrometers, employed in such systems. The use of large toner particles, however, often results in poor image quality and visual graininess.

It is therefore desirable to provide a new dry-powder electrophoretic display system. It is further desirable to provide toner compositions and particles suitable for use in such a system.

BRIEF DESCRIPTION

The present disclosure provides, in various exemplary embodiments, a dry toner composition, and/or a dry-powder electrophoretic display incorporating such a toner composition, that achieves one or more of the foregoing.

In one aspect, a toner composition is provided comprising negatively charged emulsion aggregation part ices and a colorant. A surface coating comprising a polymer selected from methacrylate polymers or polycarbonate polymers is disposed on a portion of the toner particles, wherein the surface coating imparts a positive charge characteristic to the surface of the particles. The negatively and positively charged dry toner particles so produced are particularly beneficial for use in dry-powder electronic displays.

In another aspect, the present disclosure provides a dry-powder electrophoretic display comprising a pair of electrodes disposed opposite one another and a spacer layer disposed between the electrodes to define an air gap therebetween. Included in the air gap is a first dry toner composition comprising a plurality of negatively charged toner particles of a first color, and a second dry toner composition comprising a plurality of toner particles of a different or second color and a different or second charge. In this regard, the toner particles of the second dry toner composition are covered with a surface coating to impact a positive charge. The surface coating is comprised of a polymer selected from methacrylate polymers or polycarbonate polymers. The first and second dry toner compositions are included in the air gap to produce a dry-powder electrophoretic display.

In still another aspect, the present disclosure provides a dry-powder electrophoretic display that comprises a cell having a viewed region and a non-viewed region. The cell contains a plurality of first toner particles comprising a resin and a colorant and having a negative charge, and a plurality of second toner particles comprising a resin and a second colorant. The colorants of the first toner particles and the second toner particles differ from one another. A surface coating is disposed on the outer surface of the second toner particles, wherein the surface coating comprises a methacrylate polymer and imparts a positive charge.

In yet another aspect, the present disclosure provides a dry-powder electrophoretic display that comprises a first electrode, a second electrode disposed opposite the first electrode, a spacer layer disposed between the first and second electrodes and creating an air gap therebetween, a first set of toner particles disposed between the first and second electrodes, and a second set of toner particles disposed between the first and second electrodes. The first set of toner particles comprises a resin and a colorant, and has a negative charge. The second set of toner particles comprises a resin and a colorant and further comprises a surface coating in an amount of about 1 to about 10 percent by weight of the toner particles to impact a positive charge. A non-limiting example of such a surface coating is a methacrylate polymer comprising a copolymer of butylmethacrylate/(2-dimethylaminoethyl) methacrylate methylmethacrylate.

In a further aspect, the present disclosure provides a process for preparing a dry toner composition for use in a dry-powder electrophoretic display. The process comprises forming a first set of dry toner particles comprising a resin and a colorant by an emulsion aggregation process, said first set of dry toner particles having a negative charge; and forming a second set of dry toner particles comprising a resin latex and a colorant and an outer coating, said second set of dry toner particles having a positive charge. Optionally, the second set of dry toner particles may be formed by heating a mixture of a latex and a colorant at a temperature of below about the glass transition temperature (Tg) of a polymer contained in the latex; and cooling the mixture; wherein said second set of dry toner particles is further wet surface treated with a methacrylate polymer by adding a methacrylate polymer solution to the mixture of the latex and colorant subsequent to the cooling of the latex and colorant mixture, and adjusting the pH of the resulting solution to above about 7 thereby permitting the methacrylate polymer to precipitate on the toner particles, said methacrylate polymer providing a positive charge to the surface of the toner particles of the second set of dry toner particles.

These and other aspects of the disclosure are more particularly discussed below.

BRIEF DESCRIPTION OF THE DRAWINGS

The following is a brief description of the drawings, which are presented for the purposes of illustrating the disclosure described herein and not for the purposes of limiting the same.

DETAILED DESCRIPTION

The present disclosure, as illustrated in various exemplary embodiments, relates to dry-powder electrophoretic displays employing toner particles comprising emulsion/aggregation particles. Generally, the dry-powder electrophoretic displays include at least two sets of toner particles, wherein the color of one set of toner particles differs from the color of the other sets of toner particles. Additionally, one set of toner particles has a charge opposite the charge of the other set of toner particles. That is, one set of toner particles carries a negative charge, while the other set of toner particles carries a positive charge. For example, one set of toner particles in the display includes negatively charged emulsion/aggregation particles and the other set of toner particles includes a surface coating to impart a positive charge to the surface of the toner particles. The negatively and positively charged dry toner compositions so produced are particularly beneficial for use in dry-powder electronic displays.

The present electrophoretic displays may have any configuration suitable for use in a dry-powder electrophoretic display. Generally the electrophoretic display includes a pair of electrodes disposed opposite one another, an air gap between the electrodes, and two sets of toner particles of different colors and opposite charges disposed within the air gap and between the electrodes. In embodiment, the electrodes are substantially planar, and the opposing electrodes are substantially parallel to one another. The air gap is substantially free of any dispersions or suspending fluids that are typically present as in conventional electrophoretic displays. As used herein, the term "air gap" refers to a gap between the electrodes that comprises air or other suitable gas such as, for example, argon. The dry-powder electrophoretic display substantially free of a suspending liquid as is understood in the art.

Figure 1:
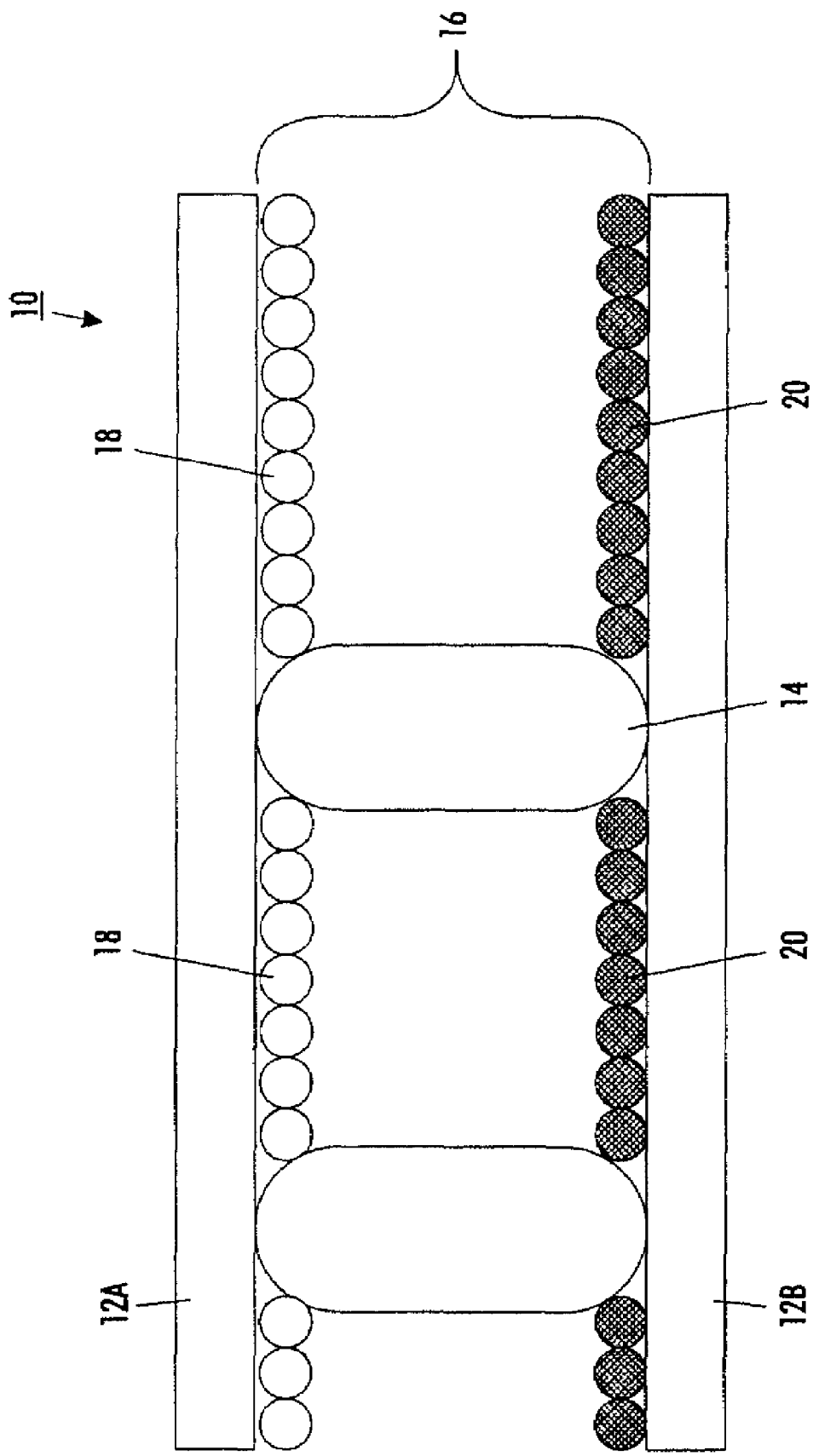
FIG. 1 is a schematic cross-section of an electrophoretic display in accordance with one exemplary embodiment.

With reference to FIG. 1, an electrophoretic display 10 includes a pair of opposing, substantially parallel electrodes 12a and 12b. Two or more spacer beads 14 are disposed between the electrodes 12a and 12b to separate the electrodes and provide an air gap 16 between the inner surfaces of the electrodes. Disposed between the electrodes are a so a plurality of toner particles 18 and 20.

The toner particles 18 and 20 are oppositely charged toner compositions. That is, one of toner particles 18 and 20 is negatively charged, and one of toner particles 18 and 20 is positively charged. Additionally, the toner particles 18 have a different color from the toner particles 20. There is no dispersion fluid between the electrode substrate, i.e., within the air gap 16. As the charge of the electrodes 12a and 12b is reversed, the oppositely charged toner particles migrate across the air gap 16 in response to the electric field, creating a light or dark image.

Figure 2:
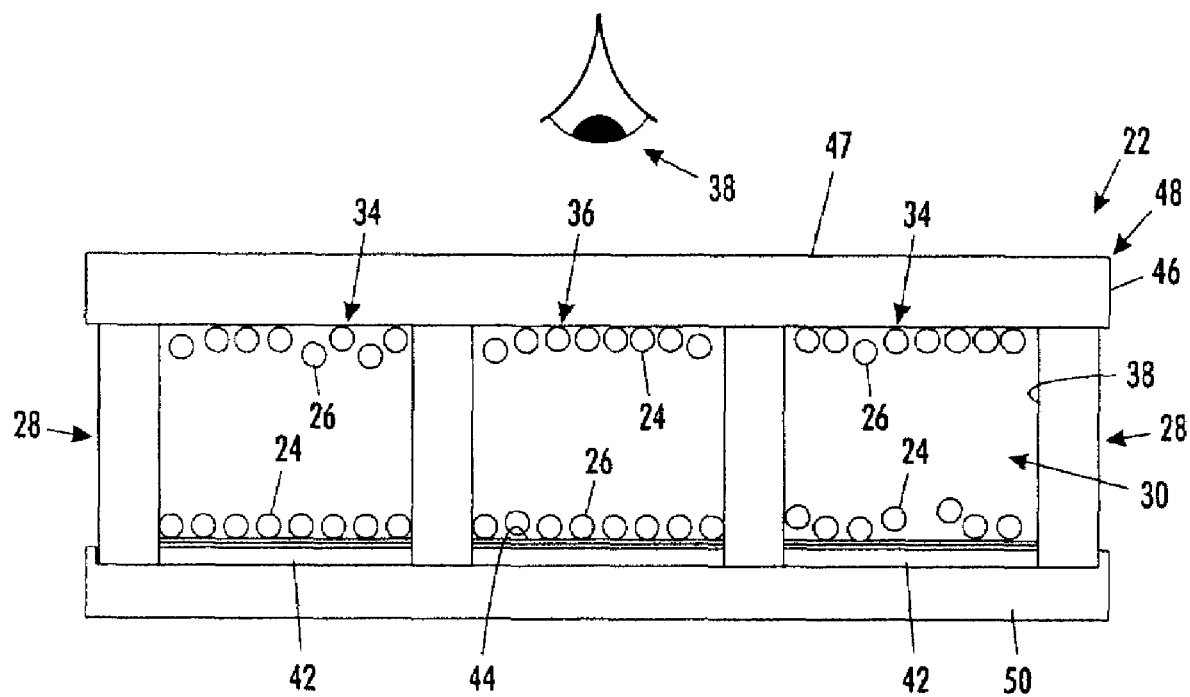
FIG. 2 depicts a series of cells containing toner particles in an air gap of a dry-powder electrophoretic display.

Referring to FIG. 2, a two-particle electrophoretic display 22 is shown, which consists of one particle species of a first color 24 (e.g. white) and another particle species of a second color 26 (e.g. black). An optically transmissive cell 28 surrounds the particles which are dispersed in an air gap 30 between the electrodes and substrates. Cells, such as cells 28, are used to prevent particle setting and particle agglomeration. The first and second particles 24, 26 differ from each other optically and in terms of at least one other physical characteristic that provides the basis for their separation. For example, the particles 24, 26 are colored differently and have different surface charges. As shown, the two-particle system consists of one particle species of a first white color 24 and another particle species of a second color 26, e.g., black, cyan, magenta, yellow, blue, red, or the like. In one configuration, the colored particles 26 carry a positive charge, while the white colored particles 24 carry a negative charge. The particle size can range from about 0.1 micron to about 20 microns. In the absence of an electric field, the particles 24, 26 are substantially immobile. Further, in the absence of an electric field, the particles 24, 26 may be attracted to the surfaces by Van der Waals forces or electrostatic forces.

Figure 3:
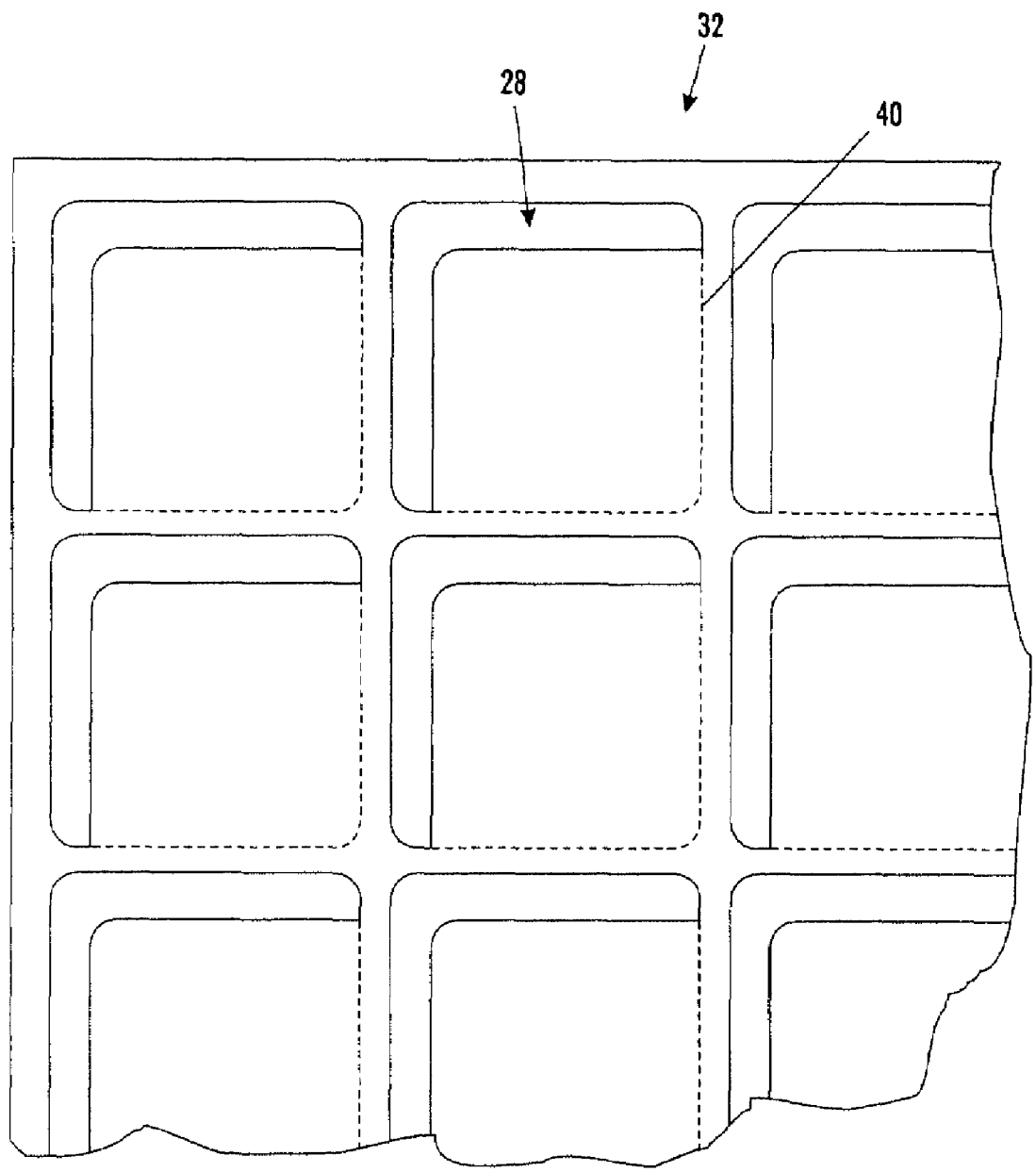
FIG. 3 shows a top perspective of a sample portion of several cells arranged in a grid or array.

As shown in FIG. 2, three cells 28 are displayed. It will be appreciated that any number of grids or arrays 32 of cells 28 may be arranged (refer to FIG. 3). It is further appreciated that the actual display of a colored state 34 or a white color state 36 is accomplished by manipulating the position of the particles 24, 26 in each cell 28 in correspondence with the observing angle 38. As shown, the cells 28 are cubical in geometry. It will be further appreciated that any number of geometric configurations may be utilized. The cells 28 represent a spacer layer and may be made from a photopolymer (i.e. SU-8 distributed by Microchem Corp.). The cells may also be made by molding or embossing. The walls 38 of the cells 28 may be coated with a material that provides a desired surface energy to prevent excessive particle adhesion. Some level of particle adhesion is acceptable, and even desirable if bistability of the display is required. The adhesion forces, however should be low enough so that particles can be removed from the surfaces, with a relatively low electric field For the electrophoretic displays described herein, the cell geometry is not essential. As an example, the visible square viewing region 40, as shown in FIG. 3, is approximately 200 microns along each side. The use of separate cells 28 prevents agglomeration and settling of the particles 24, 26.

Referring again to FIG. 2, an addressing scheme for controlling the color state of the display 22 is shown in which an electrode 42 (or set of electrodes) is adjacent a non-viewed region 44 (i.e. bottom or rear surface or back-plane) of the cells 28 and another continuous top electrode 46 is adjacent a viewed region 47 (i.e. top or front surface, or front-plane) of the cells 28. The top electrode 46 may take the form of an indium tin oxide coating (ITO) of a transparent glass substrate 48 overlying the cell array 32. The glass substrate 48 may be similar to those used in liquid crystal displays. The ITO top electrode 46 may be evaporated onto the top glass substrate 48. The ITO top electrode 46 is transparent, and the colored states 34, 36 are viewed through the ITO top electrode 46.

Underlying the cell array 32 is a glass bottom substrate 50. It will be appreciated that any addressing scheme may be used in an electrophoretic display in accordance with the present disclosure including, but not limited to, a direct addressing scheme having a fixed electrode pattern, an active matrix addressing scheme with a pixilated electrode array, and a passive matrix addressing scheme with a top and bottom plate patterned in conductive stripes. For example, the bottom substrate 50 may be a silicon wafer or a printed circuit board (PCB) with patterned electrodes or an active matrix backplane. It will be appreciated that the top and bottom electrodes 42, 46 may also be formed from flexible material, such as ITO coated Mylar™. Mylar™ is a registered trademark of E.I. DuPont Corporation, Wilmington, Del.

It will also be appreciated that the viewed and the non-viewed regions can be arranged laterally (not shown) so that the non-viewed region (although observable) is significantly smaller in area with respect to the viewed region (such as in laterally driven electrophoretic displays).

The electrodes of the electrophoretic display device may be any material suitable for such devices. At least one of the electrodes, and in particular at least the top or upper electrode through which the images formed by the device must be viewed, should be transparent in order to enable such viewing. The bottom or back electrode does not have to be transparent but may be, for example, a light reflecting or light absorbing material. Suitable materials for the include but are not limited to glass substrates, conductive plastic films and the like. For example, the electrode may be plastic films coated with indium tin oxide (ITO) such as polyethelyne terephthalate (PET) films, conductive glass films, such as ITO coated glass film, and conductive thin metals. For transparency, ITO coated plastic and glass films are typically used. The electrodes or conductive substrates may be coated with an insulating polymer or a polymer with a particular surface energy, tailored to meet a use's particular needs, to provide the appropriate or desired amount of particle adhesion.

The spacers may be any suitable material for a spacer and electrophoretic display, and may be shaped in any suitable spacer design. In embodiments, the spacer is made from fiber materials.

The spacers separate the electrodes and provide an air gap between the electrodes in which the toner particles are allowed to move or migrate. The spacers are sized to provide an acceptable air gap to allow the electrophoretic device to properly function. The size of the air gap depends on the voltage required to drive the particles back and forth between the electrodes. The size of the air gap is also based on the particle size of the toner. For operating at low voltages, the gap should be as small as possible, but yet still allow multi-layer stacking of the toner particles for good area coverage. Generally, the air gap should be at least 3-10 times the diameter of the particles to allow for satisfactory particle mobility and significant area coverage. In embodiments, the air gap in the present dry-powder electrophoretic devices is from about 3 to about 200 micrometers. In other embodiments, the air gap is from about 20 to about 75 micrometers.

The toner particles are comprised of emulsion/aggregation particles, and comprise a polymer or polymer mix, a colorant, and optionally a wax. Emulsion/aggregation particles are particles prepared by emulsion/aggregation processes. In emulsion/aggregation processes, particles are achieved via aggregation as opposed to particle size reduction. Emulsion/aggregation processes include the steps of emulsion, aggregation, coalescence, washing, and drying. Emulsion/aggregation processes for the preparation of toners are illustrated in a number of Xerox patents, including U.S. Pat. No. 5,290,654; U.S. Pat. No. 5,278,020; U.S. Pat. No. 5,308,734; U.S. Pat. No. 5,370,963; U.S. Pat. No. 5,344,738; U.S. Pat. No. 5,403,693; U.S. Pat. No. 5,418,180; U.S. Pat. No. 5,364,729; and, U.S. Pat. No. 5,346,797, the disclosures of which are incorporated in their entireties herein by reference.

The use of emulsion/aggregation particles as toner particles is advantageous in that emulsion/aggregation particles have a very narrow particle size distribution which provides more uniform movement of the particles within the system, less likelihood of agglomeration problems during operation of the electrophoretic display, and better display quality.

The resin polymers used to form the toner particles are not limited in any manner, and any material suitable for use in forming a toner particle may be used. Generally, the emulsion/aggregation process is not limited in the use of certain polymers. Examples of materials suitable to form the toners include, but are not limited to, polyesters, polyamides, polyimides, polyethelynes, polypropylenes, polyisobutyrates, acrylic based polymers, such as styrene acrylate, and styrene methacrylate, styrene butadiene, polyester-imide, ethylene-vinyl acetate copolymer, and the like.

Suitable polyester resins include, but are not limited to, polyester SPE2, available from Hercules Chemical, and polyesters of the formula:

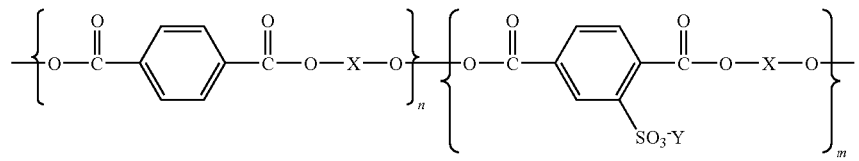

wherein Y is an alkali metal, X is a glycol, and n and m each represent the number of segments.

In embodiments suitable polyester resins include, but are not limited to, salts of copoly(1,2-propylene-dipropylene-5-sulfoisophthalate)-copoly(1,2-propylene-dipropylene terephthalate), copoly(1,2-propylene-diethylene-5-sulfoisophthalate)-copoly(1,2-propylene-diethylene terephthalate), copoly(propylene-5-sulfoisophthalate)-copoly(1,2-propylene terephthalate), copoly(1,3-butylene-5-sulfoisophthalate)-poly(1,3-butylene terephthalate), poly (butylenesulfoisophthalate)-copoly 1,3-butylene terephthalate, and the like. Illustrative examples of suitable polyester resins include the beryllium salt of copoly(1,2-propylene-dipropylene-5-sulfoisophthalate)-copoly(1,2-propylene-dipropylene terephthalate), the barium salt of copoly(1,2-propylene-diethylene-5-sulfoisophthalate)-copoly(1,2-propylene-diethylene terephthalate), the magnesium salt of copoly(1,2 dipropylene-5-sulfoisophthalate)-copoly(1,2-propylene terephthalate), the magnesium salt of copoly(1,3-butylene-5-sulfoisophthalate)-copoly(1,3-butylene terephthalate), the calcium salt of copoly(1,2 dipropylene-5-sulfoisophthalate)-copoly(1,2-propylene terephthalate), the calcium salt of copoly(1,3-butylene-5-sulfoisophthalate)-copoly(1,3-butylene terephthalate), the cobalt salt of copoly(1,2-propylene-diethylene-5-sulfoisophthalate)-copoly (1,2-propylene-diethylene terephthalate), the nickel salt of copoly(1,2 dipropylene-5-sulfoisophthalate)-copoly(1,2-propylene terephthalate), the iron salt of copoly (1,3-butylene-5-sulfoisophthalate)-copoly(1,3-butylene terephthalate), the zirconium salt of copoly(1,2-dipropylene-5-sulfoisophthalate)-copoly(1,2-propylene terephthalate), the chromium salt of copoly(1,3-butylene-5-sulfoisophthalate)-copoly(1,3-butylene terephthalate), and the like.

Additionally, the polyester resin may be the resins described in U.S. Pat. Nos. 6,593,049, and 6,756,176, the entire disclosures of which are incorporated herein by reference. The toners may also comprise a mixture of an amorphous polyester resin and a crystalline polyester resin as described in copending U.S. Ser. No. 10/349,548, which is published as U.S. Patent Application No. U.S. 2004/0142266, the entire disclosure of which is incorporated herein by reference.

Examples of latex resins or polymers suitable for use in toner particles include, but are not limited to, poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly (ethyl acrylate-butadiene), poly(propyl acrylate-butadiene), poly(butyl acrylate-butadiene), poly(styrene-isoprene), poly (methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid) poly(styrene-butyl acrylate-acrylic acid), poly(styrene-butyl acrylate-methacrylic acid), poly (styrene-butyl acrylate-acrylononitrile), and poly(styrene-butyl acrylate-acrylononitrile-acrylic acid). In embodiments, the resin or polymer is a styrene/butyl/acrylic acid terpolymer. Cross linked resins are prepared by incorporating an addition monomer such as divinyl benzene during the synthesis of the above latex resins or polymers The toner particles may include any suitable colorant. Suitable colorants include, but are not limited to dyes, pigments, and mixtures thereof. The colorant is generally present in an amount of from about 1 to about 65% by weight of the toner. In embodiments, the colorant is present in an amount of from about 2 to about 35% by weight of the toner, and in other embodiments in an amount of from about 3 to about 15% by weight of the toner. To form black toner particles, the colorant may be, but is not limited to, carbon black, magnetites, surface treated magnetites, and the like. White toner particles may be prepared by the use of titanium dioxide, aluminum oxide, zirconium oxide, zinc dioxide, and the like. Colored particles may be prepared by using colored pigments or dyes, such as, for example, cyan, magenta, yellow, red, green, brown, blue, or mixtures thereof.

Suitable colorants include black colorants like REGAL 330®; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. Suitable colored pigments or colorants include, but are not limited to, cyan, magenta, yellow, red, green, brown, blue colorants or mixtures thereof. Specific examples of pigments include phthalocyanine HELIOGEN BLUE L6900™, L7020™, D6840™, D7080™, D7020™, K6910™, and K7020™, available from BASF, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colorants that can be selected are black cyan, magenta, or yellow, and mixtures thereof. Examples of magentas are 2,9-dimethyl-substituted quinacridone and anthraquinone dye identified in the Color index as CI 60710, CI Dispersed Red 15, diazo dye identified in the Color Index as CI 26050, CI Solvent Red 19, and the like. Illustrative examples of cyans include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as colorants. Other known colorants can be selected, such as Levanyl Black A-SF (Miles, Bayer) and Sunsperse Carbon Black LHD 9303 (Sun Chemicals), Paliogen Black L9984 9BASF), Pigment Black K801 (BASF) and particularly carbon blacks such as REGAL 330, REGAL 660 (Cabot), Carbon Black 5250 and 5750 (Columbian Chemicals), and colored dyes such as Paliogen Violet 5100 and 5890 (BASF), Normandy Magenta RD-2400 (Paul Uhlrich), Permanent Violet VT2645 (Paul Uhlrich), Heliogen Green L8730 (BASF), Argyle Green XP-111-S (Paul Uhlrich), Brilliant Green Toner GR 0991 (Paul Uhlrich), Lithol Scarlet D3700 (BASF), Scarlet for Thermoplast NSD Red (Aldrich), Neopen Blue FF4012 (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan II (Matheson, Coleman, Bell), Sudan III (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1, and FGL (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Sico Fast Yellow D1165, D1355, and D1351 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich) Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF). Additional useful colorants include pigments in water based dispersions such as those commercially available from Sun Chemical, for example SUNSPERSE BHD 6011X (Blue 15 Type), SUNSPERSE BHD 9312X (Pigment Blue 15 74160), SUNSPERSE BHD 6000X (Pigment Blue 15:3 74160), SUNSPERSE GHD 9600X and GHD 6004X (Pigment Green 7 74260), SUNSPERSE QHD 6040X (Pigment Red 122 73915), SUNSPERSE RHD 9668X (Pigment Red 185 12516), SUNSPERSE RHD 9365X and 9504X (Pigment Red 57 15850:1, SUNSPERSE YHD 6005X (Pigment Yellow 83 21108), FLEXIVERSE YFD 4249 (Pigment Yellow 17 21105), SUNSPERSE YHD 6020X and 6045X (Pigment Yellow 74 11741), SUNSPERSE YHD 600X and 9604X (Pigment Yellow 14 21095), FLEXIVERSE LFD 4343 and LFD 9736 (Pigment Black 7 77226) and the like or mixtures thereof. Other useful water based colorant dispersions include those commercially available from Clariant, for example, HOSTAFINE Yellow GR, HOSTAFINE Black T and Black TS, HOSTAFINE Blue B2G, HOSTAFINE Rubine F6B and magenta dry pigment such as Toner Magenta 6BVP2213 and Toner Magenta EO2 which can be dispersed in water and/or surfactant prior to use. The white pigment may be chosen from compound such as, for example, titanium dioxide, aluminum oxide, zirconium oxide and zinc dioxide.

Any suitable effective positive or negative charge enhancing additive can be selected for the toner compositions of the present disclosure. Such additives may be present in embodiments, in an amount of about 0.1 to about 10, and, in other embodiments, may be present in an amount of about 1 to about 3 percent by weight. Examples of these additives include quaternary ammonium compounds inclusive of alkyl pyridinium halides; alkyl pyridinium compounds, reference U.S. Pat. No. 4,298,672, the disclosure of which is totally incorporated hereby by reference; organic sulfate and sulfonate compositions, reference U.S. Pat. No. 4,338,390, the disclosure of which is totally incorporated hereby by reference; cetyl pyridinium tetrafluoroborates; distearyl dimethyl ammonium methyl sulfate; aluminum salts such as BONTRON E84™ or E88™ (Hodogaya Chemical); and the like.

In embodiments, the process for forming the toner particles may include (i) providing a coolant dispersion comprising a colorant, water, an ionic surfactant, a nonionic surfactant or mixtures of an ionic surfactant and a nonionic surfactant, and providing a latex emulsion comprising a resin, a nonionic surfactant and an ionic surfactant; (ii) blending the colorant dispersion with the latex emulsion, resin, a nonionic surfactant and an ionic surfactant and optionally adding a wax dispersion comprised of, for example, submicron particles in the diameter size range of from about 0.1 to about 0.4 micron dispersed in an ionic surfactant of the same charge polarity as that of the ionic surfactant in the colorant dispersion or latex emulsion; (iii) heating the resulting mixture below about, or about equal to the glass transition temperature ($T_g$) of the latex resin to form toner sized aggregates; and (iv) heating the resulting aggregate suspension above about the Tg of the latex resin. A surface coating as described herein, for example, a methacrylate copolymer, available from Rohm American Inc. as EUDRAGIT®, may be added to the above mixture and a toner which contains a surface coating, such as the methacrylate copolymer, may be isolated.

In other embodiments, the process may include (i) providing or generating a latex emulsion of resin, water, and an ionic surfactant, and providing or generating a colorant dispersion containing a colorant, water, an ionic surfactant, or a nonionic surfactant; (ii) optionally providing or generating a wax dispersion containing an anionic surfactant similarly charged to that of the latex surfactant emulsion; (iii) blending the wax dispersion (if used) with the colorant dispersion; (iv) heating the resulting mixture below the glass transition temperature (Tg) of the latex resin; (v) heating (iv) above about the Tg of the latex resin; (vi) adding a surface coating as described herein, such as, for example a methacrylate copolymer, available from Rohm American Inc. as EUDRAGIT®, in an amount of from about 3 to about 7 weight percent; (vii) retaining the mixture (vi) at a temperature of from about 70° C. to about 95° C. for about 3 to about 10 hours; (vii) retaining the mixture (vi) at a temperature of from about 70° C. to about 95° C. for about 3 to about 10 hours; (viii) washing the resulting toner slurry; and (ix) isolating the toners.

The process may include adding an additional latex wherein the added latex contains the same resin as the initial latex, or wherein the added latex contains a dissimilar resin as compared to that of the initial latex resin.

In embodiments, aggregation of the latex resin and colorant may be accomplished by heating at a temperature below the glass transition temperature of the resin or polymer contained in the latex and coalescence may be accomplished by heating at a temperature of about the glass transition temperature of the polymer contained in the latex to enable fusion or coalescence of colorant and latex resin, followed by mixing of the composition resulting with a surface coating solution, such as a methacrylate copolymer. In embodiments, the aggregation temperature may be from about 45° C. to about 55° C., and the coalescence temperature may be from about 75° C. to about 97° C. In still other embodiments, the aggregation temperature is from about 50° C. to about 60° C., and the coalescence temperature is from about 80° C. to about 95° C.

In embodiments, the latex emulsion comprises submicron resin particles in the size range of about 100 to about 500 nanometers, and more specifically, in the size range of about 100 to about 500 nanometers, and more specifically, in the size range of about 150 to about 400 nanometers in water and an ionic surfactant, and more specifically, an anionic surfactant; the colorant dispersion comprises submicron pigment particles of about 50 to about 250 nanometers and more specifically, of about 80 to about 200 nanometers in size diameter; a first coagulant comprising of a poly halide such as poly Aluminum chloride (PAC) or poly aluminum sulfosilicate (PASS) and optionally a second coagulant such as a cationic surfactant comprising, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, and which coagulant surfactant component is selected in an amount of, for example, from about 0.01 to about 10 percent by weight of toner; during or subsequent to heating, a second latex is added, and which latex is comprised of submicron resin particles suspended in an aqueous phase containing an ionic surfactant, and wherein the second latex is optionally selected in an amount of about 15 to about 35 percent by weight of the initial latex.

In other embodiments, the second latex is added and enables formation of a coating on the resulting toner aggregates of (v), and wherein the thickness of the formed coating is from about 0.1 to about 1 micron.

In embodiments, for example, white toner particles are prepared by aggregating dispersions of a styrene butylacrylate, carboxylic acid terpolymer, non cross-linked resin particles, a second cross-linked copolymeric resin of styrene/butylacrylate/carboxylic acid divinyl benzene, and a titanium dioxide pigment in the presence of two cationic coagulants to provide aggregates. The aggregates have a particle size of about 5.7 micrometers. The aggregates are then coalesced at temperatures above the glass transition temperature of the non cross-linked resin to provide spherical particles of 5.7 micrometers with a GSD of about 1.22. Particles are then washed four times with dionized water and dried. Color toners may be prepared in a similar manner, but with the use of a different pigment to provide the appropriate or desired color.

In embodiments, toner particles, may be prepared by a process that includes (i) blending a latex emulsion with a colorant dispersion comprised of submicron, about for example 0.05 to about 1 micron in diameter, particles suspended in a nonionic surfactant and water, and optionally adding a wax dispersion comprised of submicron wax particles dispersed in an ionic surfactant of a similar charge polarity to that of the ionic surfactant in the latex emulsion, and wherein the latex contains submicron resin particles, an ionic surfactant and water;

(ii) adding to the blend two coagulants of a polymetal halide dissolved in a strong acid and an ionic surfactant of opposite charge polarity to that of the latex surfactant and pigment ionic surfactant to initiate flocculation of the latex and the white particles;

(iii) heating the resulting mixture below the glass transition temperature (Tg) of the latex resin to form toner sized aggregates;

(iv) optionally adding a latex to the formed toner aggregates;

(v) adjusting the pH of the toner aggregates from about 1.8 to about 3 to a pH value of about 6.5 to about 8 with a base;

(vi) heating the resulting aggregate suspension of (v) to above the Tg of the latex resin;

(vii) retaining the temperature of the mixture (vi) from about 70 to about 95° C., followed by a reduction of the pH to about 4.8 to about 6, and then optionally retaining the temperature for a period of about 0.5 to about 6 hours; and (viii) cooling the reactor contents and isolating the particles, by washing, and drying.

In another embodiment, a process for the preparation of toner compositions comprises.

(i) preparing an emulsion latex comprised of sodio sulfonated polyester resin particles of from about 5 to about 500 nanometers in size diameter by heating said resin in water at a temperature of from about 65° C. to about 90° C.

(ii) preparing a pigment dispersion in water by dispersing in water from about 10 to about 25 weight percent of sodio sulfonated polyester and from about 1 to about 5 weight percent of pigment;

(iii) adding the pigment dispersion to a latex mixture comprised of sulfonated polyester resin particles in water with shearing, followed by the addition of a divalent salt dissolved in water until aggregation results as indicated by an increase in the latex viscosity of from about 2 centipoise to about 100 centipoise;

(iv) heating the resulting mixture at a temperature of from about 45° C. to about 55° C. thereby causing further aggregation and enabling coalescence, resulting in toner particles of from about 4 to about 9icrons in volume average diameter and with a geometric distribution of less than about 1.3; and optionally (v) cooling the product mixture to about 25° C. and followed by washing and drying.

The present dry-powder electrophoretic displays comprise two sets of oppositely charged toners. Namely, one set of toner particles is negatively charged and the other set is positively charged. As used herein, a set of toner particles refers to a plurality of toner particles of the same color. A set of toner particles, has, in embodiments, the same general composition and pigment/colorant makeup. As described herein, the toner particles are generally emulsion/aggregation particles. Emulsion/aggregation particles are typically negatively charged. Therefore, at least one set of the toner particles needs to be treated to impart a positive charge to the particles. Along these lines, a surface coating is disposed on or applied to the surface of at least one set of the toner particles, and in embodiments to the colored toner particles in an electrophoretic display employing white toner particles and colored toner particles. Generally, the surface coating should be optically transparent, capable of forming a uniform film, and must also be a non-conductive material. Materials suitable as the surface coating include, but are not limited to, polycarbonate, and methacrylate copolymers.

A suitable methacrylate copolymer is available from Rohm American Inc. as EUDRAGIT®. The methacrylate copolymer is, in embodiments, butylmethacrylate-(2-dimethylaminoethyl)methacrylate-methylmethacrylate copolymer (1:2:1). The methacrylate copolymer can be dispersed in water. The copolymer possesses an average particle size diameter of for example, from about 50 to about 500 nanometers (nm). In embodiments, the copolymer possesses an average particle size of from about 100 to about 300 nanometers (nm).

Examples of specific polymers that may be selected are EUDRAGIT® RL and RS polymers (Rohm Pharma) which are copolymers synthesized from acrylic and methacrylic esters with a low content of quaternary ammonium groups. EUDRAGIT® RL and RS differ in the molar ratios of the ammonium groups to the remaining neutral (meth)acrylic acid esters (1:20 and 1:40 respectively). EUDRAGIT® NE polymers are an aqueous dispersion of a neutral copolymer based on ethyl acrylate and methyl methacrylate. EUDRAGIT® RD 100 is the powder form of copolymers of acrylate and methacrylates with a quaternary ammonium group in combination with sodium carboxymethylcellulose.

Various suitable effective amounts of the methacrylate copolymer including, for example, the copolymer available from Rohm American Inc. as EUDRAGIT®, can be selected. Generally, the surface coating material should be present in an effective amount to provide a surface coating that is from about 1 to about 10 percent by weight of the toner composition. As used herein, the weight of the surface coating refers to the percent by weight of the coating on each toner particle in the toner composition. In embodiments, the surface coating material should be present in an effective amount to provide a surface coating that is from about 3 to about 7 percent by weight of the toner composition.

The surface coating may be disposed on or coated on the toner particles by any suitable method. Suitable methods for forming surface coated toners, and particularly toners coated with a methacrylate polymer such as, for example, Eudragit® polymers, are described in U.S. patent application Ser. No. 10/446,015 filed on May 27, 2003, the entire disclosure of which is incorporated herein by reference. In embodiments, the surface coating material is added in its dissolved form to an acidified slurry of toner particles. The pH of the slurry is then adjusted so that the surface coating material precipitates on the surface of the toner. Without being bound to any particular theory, it is believed that a film of the surface coating is formed on the surface of the toner particles upon the evaporation of the water. By the formation of the surface coating film, the surface of the toner acquires the (cationic) characteristics of the surface treatment additive, which results in a positively charged toner.

In embodiments, the cationic polymer is a EUDRAGIT® series polymer, such as, for example, EUDRAGIT® EPO (hereinafter "EEPO"), which is reversibly soluble-insoluble in aqueous solution when the pH is changed and, therefore, the solubility of EEPO can be considered pH-dependent. The EEPO becomes water soluble via salt formation with acids and can be added in this form to the acidic toner slurry. It is hypothesized that the water-soluble polymer would interact in solution with the toner particles even at low pH. Once the polymer has time to adsorb to the toner particles, the pH can be shifted to basic conditions. At this point the polymer will precipitate onto the toner's surface and form a film around the toner upon the evaporation of water. The surface of the toner is hypothesized to acquire the cationic characteristics of the polymer resulting in a positive charged toner.

Figure 4:
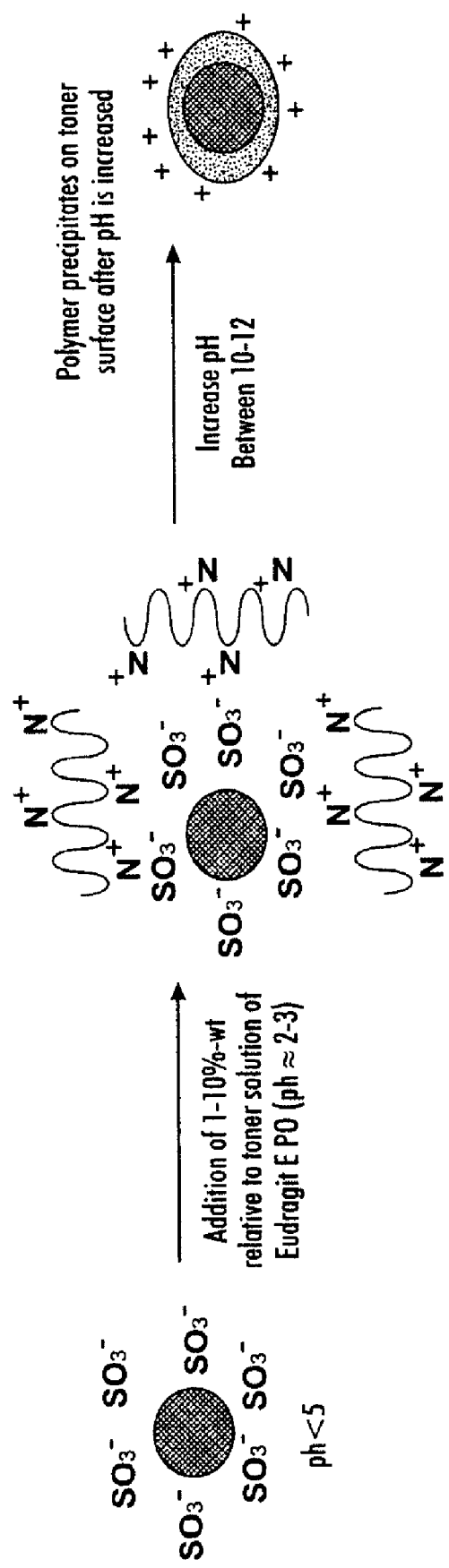
FIG. 4 is a drawing illustratively representing the layering or precipitation of EEPO on the surface of a toner particle.

More specifically, in embodiments, the EEPO polymer contains tertiary amino functional groups capable of ionic interactions with, for example, sulfonated groups on the surface of the polyester toner. The neighboring polymer chain and toner particle surface become complexed to one another resulting, in a modification of the properties of the particle surface and thus the tribocharging characteristics. The surface treatment approach, in embodiments, is to add the polymer in its dissolved form to the toner slurry following the toner fabrication process. The toner slurry is adjusted to a pH of for example from about 2 to about 3 to permit the EEPO to remain dissolved during the addition period. It is hypothesized that the water-soluble polymer interacts with the toner particles via electrostatic attraction, even at low pH, and will not substantially precipitate or irreversibly complex to each other. Once the pH is increased to from about 10 to about 12, the EEPO will precipitate onto the toner surface and form a film or layer of positive-charged polymeric material around the toner surface. Evaporating the water from the toner by for example, freeze drying the toner particles promotes further coalescence of the polymeric film to the toner surface. This process is illustratively represented in FIG. 4.

In embodiments employing a set of white toner particles and a set of colored or black toner particles, the white toner particles typically carry a negative charge, and the colored or black toner particles typically include a surface coating as described herein. In embodiments employing two different colored toners, any toner may be the negatively charged toner and any toner may be treated with a surface coating as described herein.

In embodiments, the toner particles have a particle size of less than about 20 micrometers. In other embodiments, the toner particles have a particle size of from about 1 to about 20 micrometers. In further embodiments, the toner particles have a particle size of about 1 to about 10, and may be from about 4 to about 7 micrometers.

In another preferred embodiment, the toner particles comprises a shape factor of about 110 to about 130, where a shape factor of 100 is defined as a particle which is perfectly spherical in shape. The present application would require that the particle be as spherical in shape to reduce the drag, and hence provide easier movement on applying an electrical field. In another preferred embodiment, the toner particles comprises of a particle circularity of about 0.920 to about 0.980, as measured by the FPIA instrument, where a particle circularity of 1.00 is considered perfectly spherical.

The present toner particles may be used in a dry-powder electrophoretic display. A dry-powder electrophoretic display, as used herein contains either no dispersion fluid or is substantially free of a dispersion fluid. Modifying the surface of the toners, such as with a surface coating as described herein, allows for selective tuning of the surface charge to be either positive or negative.

Two sets of oppositely charged dry toner particles are disposed between two electrodes. The electrodes are separated by spacer beads which create an air gap between the two electrodes. Generally, at least one of the two sets of toner particles includes a surface coating as described herein to impart a positive charge to the set of toner particles. As the charge on the electrodes is reversed, the oppositely charged toner particles migrate back and forth across the gap in response to the electric field, thereby creating a light or dark image to the viewer.

Typically, to create an image, the electrodes or substrates are connected to a voltage source. As the charge or an electrode is changed, the charged particles migrate toward the oppositely charged electrode. When a negative voltage is applied to the upper electrode or conductive substrate, the positively charged toner particles comprising the surface coating migrate to the upper electrode as conductive substrate to give an appearance corresponding to the color of the positively charged toner particles. When a positive charge is applied, the negatively charged toner particles, i.e., the toner particles without the surface coating, migrate toward the upper electrode or conductive substrate to provide a color appearance corresponding to the color of the negatively charged toner particles. The color appearance will remain in a given state even if a voltage is not applied.

The present exemplary embodiments are further illustrated by the following examples. The examples are merely illustrative, and are not intended to be limiting in any manner.

EXAMPLES

Example I

Surface Treated Toners

Preparation of Sodio Sulfonated Polyesters:

A linear sulfonated random copolyester resin comprised of, on a mol percent basis, 0.465 of terephthalate, 0.035 of sodium sulfoisophthalate, 0.475 of 1,2-propanediol, and 0.025 of diethylene glycol was prepared as follows. In a 5 gallon Parr reactor equipped with a bottom drain valve, double turbine agitator, and distillation receiver with a cold water condenser were charged 3.98 kilograms of dimethylterephthalate, 451 grams of sodium dimethyl sulfoisophthalate, 3.104 kilograms of 1,2-propanediol (1 mole excess of glycol), 351 grams of diethylene glycol (1 mole excess of glycol), and 8 grams of butyltin hydroxide oxide catalyst. The reactor was then heated to 165° C. with stirring for 3 hours whereby 1.33 kilograms of distillate was collected in the distillation receiver, and which distillate was comprised of about 98 percent by volume of methanol and 2 percent by volume of 1,2-propanediol as measured by the ABBE refractometer available from American Optical Corporation. The reactor mixture was then heated to 190° C. over a one hour period, after which the pressure was slowly reduced from atmospheric pressure to about 260 Torr over a one hour period, and then reduced to 5 Torr over a two hour period with the collection of approximately 470 grams of distillate in the distillation receiver, and which distillate was comprised of approximately 97 percent by volume of 1,2-propanediol and 3 percent by volume of methanol as measured by the ABBE refractometer. The pressure was then further reduced to about 1 Torr over a 30 minute period whereby an additional 530 grams of 1,2-propanediol were collected. The reactor was then purged with nitrogen to atmospheric pressure, and the polymer product discharged through the bottom drain onto a container cooled with dry ice to yield 5.60 kilograms of 3.5 mol percent sulfonated polyester resin, sodio salt of (1,2-propylene-dipropylene-5-sulfoisophthalate)-copoly(1,2-propylene-dipropylene terephthalate). The sulfonated polyester resin glass transition temperature was measured to be 56.6° C. (onset) utilizing the 910 Differential Scanning Calorimeter available from E.I. DuPont operating at a heating rate of 10° C. per minute. The number average molecular weight was measured to be 3,250 grams per mole, and the weight average molecular weight was measured to be 5,290 grams per mole using tetrahydrofuran as the solvent.

Preparation of a Sodio Sulfonated Polyester Colloid Solution:

A 15 percent solids concentration of a colloidal solution of sodio-sulfonated polyester resin particles with particle diameter sizes of from about 5 to about 150 nanometers, and typically about 20 to about 40 nanometers dissipated in 85 percent aqueous media of water was prepared by first heating about 2 liters of deionized water to about 85° C. with stirring, and adding thereto 300 grams of the above prepared sulfonated polyester resin, followed by continued heating at about 85° C., and stirring of the mixture for a duration of from about one to about two hours, followed by cooling to about room temperature, about 25° C. throughout the Examples. The colloidal solution of sodio-sulfonated polyester resin particles possessed a characteristic blue tinge and particle sizes of from about 5 to about 150 nanometers, and typically of about 20 to about 40 nanometers, as measured by the NiCOMP® particle sizer.

Toner 1: Sodio Sulfonated Polyester Toner (Control, Untreated)

A pilot plant batch of toner comprised of a sodio-sulfonated polyester (SPE4, 12% solids and 88% deionized water), 9% Carnauba wax dispersion and 6%-wt of Flexiverse Blue (Pigment Blue 15:3, BFD1121, 47.1% solids) dispersion (Sun Chemical Co.) was prepared. Aggregation of the cyan polyester toner particles was completed at 58° C. (degrees Centigrade throughout) in a 30-gallon stainless steel reactor (of which only 20 kg of the toner yield was used for bench scale studies). The agitation rate was set initially to 100 RPM. A 5% zinc acetate solution was added as the coagulant via the FIZA or fast initial zinc addition (FIZA) technique as illustrated in U.S. Pat. No. 6,395,445, where 60-80% of the total zinc acetate solution was added quickly (600 g/min for the first 30 minutes) and the remainder (80-100 g/min thereafter) was added at a reduced rate. The amount of zinc acetate added equaled approximately 11% of the total resin in the emulsion. After 7 hours of aggregation, the particle size reached 5.24 µm with a GSD of 1.2. Full cooling was applied and particles were sieved at 30-35° C. through a 25 µm nylon filter bag. A portion of the toner slurry was washed in the lab three times with deionized water after the mother liquor removal, resuspended to approximately 25% weight solids and freeze-dried for 48 hours to provide the untreated parent toner (VF173 or Control). This toner was comprised of 85% sodio-sulfonated polyester, 9% Carnauba wax dispersion and 6%-wt of Flexiverse Blue pigment.

Toner 2: Treated Sodio Sulfonated Polyester Toner

Preparation of EEPO Solution

An aminoalkylmethacrylate copolymer called Eudragit EPO (EEPO), which was delivered to toner as a 1 percent (wt/wt) solution in deionized water (DIW), was prepared by dissolving 1.26 grams of the EEPO in 124.7 grams of 0.3 M HNO$_3$; the pH of the solution was lowered to 2.0 by adding 2.4 grams of 1.0 M HNO$_3$. Lowering the pH of the aqueous solution to 2.0 ensured complete solubility of the EEPO polymer in the solution. The total percentage of EEPO to toner was to equal 3% weight of dry toner.

Coating Procedure of EEPO onto Surface of Polyester Toner Particles

The above toner (Toner 1) made up of 85% sodio-sulfonated polyester, 9% Carnauba wax dispersion and 6%-wt of Flexiverse Blue was treated in the lab via a pH shifting procedure where EEPO is soluble or insoluble in an aqueous solution depending on the pH of the aqueous solution.

A 327 gram quantity of the toner slurry (12.9%-weight solids in 87.1% mother liquor) made up of 85% sodio-sulfonated polyester, 9% Carnauba wax dispersion and 6%-wt of Flexiverse Blue pigment was separated from its mother liquor via decanting, and then stirred in a 1-L glass Erlenmeyer flask on a stir plate at 250-300 rpm. The pH of the toner slurry was lowered from 5.5 to 2.4 by the addition of 70 grams of 0.3 M HNO$_3$. The EEPO solution was added drop wise to the toner slurry and stirred for 1 hour at room temperature. After 1 hour the pH of the toner slurry was increased to 12.2 with 71 grams of 1.0 M NaOH and left to stir at 300 rpm for 18 to 20 hours overnight at ambient temperature. The surface-treated toner was then filtered and washed four times. The filtercake was then resuspended to approximately 25%-wt solids and freeze-dried. The pH of the filtrates was always greater than 9.5 and showed no sign of precipitated EEPO; it can be assumed that all EEPO polymer was transferred to the toner surface. This toner was comprised of—85% sodio-sulfonated polyester, 9% Carnauba wax dispersion and 6%-wt of Flexiverse Blue pigment with 3% EEPO relative to dry toner weight deposited or coated on the toner's surface.

Example II

Untreated Toners

Preparation of Styrene Butylacrylate Carboxylic Acid Latex: (Latex B)

A latex emulsion (i) comprised of polymer particles generated from the emulsion polymerization of styrene, butyl acrylate and beta carboxy ethyl acrylate (Beta CEA) was prepared as follows. A surfactant solution of 434 grams of DOWFAX 2A1™—disodium dodecyl diphenyloxide disulfonate (anionic emulsifier) and 387 kilograms of deionized water was prepared by mixing for 10 minutes in a stainless steel holding tank. The holding tank was then purged with nitrogen for 5 minutes before transferring the mixture into a reactor. The reactor was then continuously purged with nitrogen while being stirred at 100 RPM. The reactor was then heated to 80° C.

Separately, 6.11 kilograms of ammonium persulfate initiator were dissolved in 30.2 kilograms of deionized water. Also, separately a monomer emulsion A was prepared in the following manner. 315.7 Kilograms of styrene, 91.66 kilograms of butyl acrylate, 12.21 kilograms of beta-CEA, 7.13 kilograms of 1-dodecanethiol, 1.42 kilograms of decanediol diacrylate (ADOD), 8.24 kilograms of DOWFAX™ (anionic surfactant), and 193 kilograms of deionized water were mixed to form an emulsion. Five percent of the above emulsion was then slowly fed into the reactor containing the aqueous surfactant phase at 80° C. to form the seeds wherein the "seeds" refer, for example, to the initial emulsion latex added to the reactor, prior to the addition of the initiator solution, while being purged with nitrogen. The above initiator solution was then slowly charged into the reactor, forming about 5 to about 12 nanometers of latex "seed" particles. After 10 minutes, the remainder of the emulsion was continuously fed in using metering pumps.

Once all of the above monomer emulsion was charged into the main reactor, the temperature was maintained at 80° C. for an additional 2 hours to complete the reaction. The reactor contents were then cooled down to about 25° C. The resulting isolated product was comprised of 40 weight percent of sub-micron, 0.5 micron, diameter resin particles of styrene/butylacrylate/beta CEA suspended in 60 percent water and 1.5 pph of the anionic surfactant. The molecular properties resulting for the resin latex were $M_w$ of 39,000, $M_n$ of 10.8, as measured by a Gel Permeation Chromatograph, and a midpoint Tg of 55.8° C., as measured by a Differential Scanning Calorimeter, where the midpoint Tg is the halfway point between the onset and the offset Tg of the polymer.

Preparation of Cross-Linked Latex (Latex C)

A cross-linked latex emulsion comprised of polymer particles generated from the emulsion polymeirization of styrene, butyl acrylate and beta carboxy ethyl acrylate (β) CEA was prepared as follows. A surfactant solution of 4.08 kilograms of NEOGEN™ RK (anionic emulsifier) and 78.73 kilograms of deionized water was prepared by mixing these components for 10 minutes in a stainless steel holding tank. The holding tank was then purged with nitrogen for 5 minutes before transferring the resulting mixture into the above reactor. The reactor was then continuously purged with nitrogen while the contents were being stirred at 100 RPM. The reactor was then heated up to 76° C., and held there for a period of 1 hour.

Separately, 1.24 kilograms of ammonium persulfate initiator was dissolved in 13.12 kilograms of deionized water.

Also separately, monomer emulsion was prepared in the following manner. 47.39 Kilograms of styrene, 25.52 kilograms of butyl acrylate, 2.19 kilograms of β-CEA, 0.729 kilogram of divinyl benzene (DVB) crosslinking agent, 1.75 kilograms of NEOGEN™ RK (anionic surfactant), and 145.8 kilograms of deionized water were mixed to form an emulsion. One (1) percent of the emulsion was then slowly fed into the reactor, while the reactor was being purged with nitrogen, containing the aqueous surfactant phase at 76° C. to form "seeds". The initiator solution was then slowly charged into the reactor and after 40 minutes the remainder of the emulsion was continuously fed in using metering pumps over a period of 3 hours.

Once all the monomer emulsion was charged into the above main reactor, the temperature was held at 76° C. for an additional 4 hours to complete the reaction. Cooling was then accomplished and the reactor temperature was reduced to 35° C. The product was collected into a holding tank. After drying, the resin latex onset Tg was 53.5° C. The resulting latex was comprised of 25 percent cross-linked resin, 72.5 percent water and 2.5 percent anionic surfactant. The resin had a ratio of 65:35:3 pph:1 pph of styrene:butyl acrylate:β-CEA:DVB. The mean particle size of the gel latex was 50 nanometers as measured on disc centrifuge, and the resin in the latex possessed a crosslinking value of 25 percent as measured by gravimetric method.

Toner 3: White Particles (Non Cross-Linked)

310 grams of the above prepared latex emulsion (latex B) and 164 grams of an aqueous titanium dioxide ($TiO_2$) dispersion containing 97 grams of $TiO_2$ with a solids loading of 66.6 percent, were simultaneously added to 600 milliliters of water with high shear stirring by means of a polytron. To this mixture was added 11.25 grams of a polyaluminum sulfosilicate (PASS) solution containing 1.25 grams of PASS, 10 percent solids and 10 grams of 0.2 molar nitric acid, over a period of 1 minute, followed by the addition of 11.25 grams of cationic surfactant solution containing 1.25 grams of the coagulant SANIZOL B™ (60 percent active ingredients) and 10 grams of deionized water, and blended at a speed of 5,000 rpm for a period of 3 minutes. The resulting mixture was transferred to a 2 liter reaction vessel and heated at a temperature of 47° C. for 120 minutes resulting in aggregates of a size of 6 micrometers and a Geometric Standard Deviation ("GSD") of 1.19. To the toner aggregates were added 130 grams of the above prepared latex followed by stirring for an additional 90 minutes; the temperature was held at 47° C. The particle size of the aggregates was found to be 6.2 with a GSD of 1.19.

The pH of the resulting mixture was then adjusted from 2 to 7.9 with aqueous base solution of 4 percent sodium hydroxide and allowed to stir for an additional 15 minutes. Subsequently, the resulting mixture was heated to 93° C. and retained there for a period of 1 hour where the particle size measured was 6.2 micrometers with a GSD of 1.20. This was followed by the reduction of the pH to 5.8 with 4 percent nitric acid solution and allowed to stir for an additional 40 minutes. The particle size was 6.2 micrometers with a GSD of 1.20. The pH of the mixture was further decreased to 5, and allowed to coalesce for an additional 1 hour resulting in spherical particles with a size of 6.3 micrometers and a GSD of 1.21. The reactor was then cooled down to room temperature and the particles were washed 4 times with deionized water. The toner particles obtained were comprised of 73 percent styrene butylacrylate BCEA resin and 27 percent titanium pigment, and these particles dried on a freeze dryer at a temperature of −80° C. for a period of 2 days.

Toner 4: White Particle (Cross-Linked)

About 222 grams of the above prepared latex emulsion (latex B) along with 88 gm of latex C and 164 grams of an aqueous titanium dioxide ($TiO_2$) dispersion containing 64 grams of $TiO_2$ with a solids loading of 66.6 percent, and 33.4 percent water were simultaneously added to 600 milliliters of water with high shear stirring by means of a polytron. To this mixture were added 11.25 grams of a polyaluminum sulfosilicate (PASS) solution containing 1.25 grams of PASS of 10 percent solids of polyaluminum sulfosilicate and 10 grams of 0.2 molar nitric acid, over a period of 1 minute, followed by the addition of 11.25 grams of a cationic surfactant solution containing 1.25 grams of the coagulant SANIZOL B™ (60 percent active ingredients) and 10 grams of deionized water and blended at a speed of 5,000 rpm for a period of 3 minutes. The resulting mixture was transferred to a 2 liter reaction vessel and heated at a temperature of 45° C. for 110 minutes resulting in aggregates of a size diameter of 5.1 micrometers and a Geometric Standard Deviation ("GSD") of 1.20. To the resulting toner aggregates were added 130 grams of the above prepared latex followed by stirring for an additional 90 minutes; the temperature was then increased to 47° C. The particle diameter size of the aggregates was found to be 5.4 and a GSD of 1.19.

The pH of the resulting mixture was then adjusted from about 2 to about 7.9 with aqueous base solution of 4 percent sodium hydroxide and allowed to stir for an additional 15 minutes. Subsequently, the resulting mixture was heated to 93° C. and retained there for a period of 1 hour where the particle size of the formed aggregates was 5.6 micrometers with a GSD of 1.21. This was followed by the reduction of the pH to 5.5 with 5 percent nitric acid solution and followed by stirring for an additional 40 minutes. The diameter particle size of the formed aggregates measured was 5.7 micrometers with a GSD of 1.21. The pH of the mixture was further decreased to 5 and allowed to coalesce for an additional 1 hour, resulting in spherical particles with a size diameter of 5.7 micrometers and a GSD of 1.21. The reactor was then cooled down to room temperature, about 22° C. to about 25° C., and the resulting particles were washed 4 times with deionized water with the final wash at a pH of 4. The particles were then dried on a freeze dryer at a temperature of −80° C. for a period of 2 days. The toner particles obtained were comprised of 60 percent styrene butylacrylate BCEA, 20 percent styrene butylacrylate BCEA, bivinylbenzene resin and 20 percent titanium dioxide pigment.

Toner 5: Magenta Toner

Similarly, a 6.2 micron magenta toner containing 6 percent pigment containing 60% PR 122, and 40 percent PR 238 was prepared using the procedure set forth in Example 2.

Toner 6: Yellow Toner

Similarly, a 6.5 micron magenta toner containing 8 percent pigment (PY 74) was prepared using the procedure set forth in Example 2.

Toner 7: Black Toner

Similarly, a 6.8 micron black toner containing 6% Regal 330 was prepared using the procedure set forth in Example 2. The toner comprised 85% sodio-sulfonated polyester, 9% Carnauba wax dispersion and 6% (by weight) of Regal 330 pigment with 3% EEPO relative to dry toner weight deposited or water on the toner's surface.

Display Testing

The above toners were identified as candidate materials for dry-powder electrophoretics. The following toner combinations were tested in a parallel plate cell as follows. A small quantity of positive and negatively charged toner particles (around 10-20 mg each) were added to a glass vial, followed by 5-10 mg of 25 um glass fiber spacer particles. The toner and fiber mixture was thoroughly mixed with a small spatula, and the mixture was applied to a 2×2 inch ITO coated glass plate by tapping. The powder was spread by hand to create a uniform coating on the ITO coated glass surface. The coated glass plate was covered with a second glass plate and the two plates were rubbed back and forth against one another to further spread the toner mixture, and evenly distribute the spacer fibers. The two plates were finally secured together using binder clips.

| Sample | NEGATIVELY CHARGED TONER PARTICLES | POSITIVELY CHARGED TONER PARTICLES |
|---|---|---|
| 1 | Toner 5 | Toner 2 |
| 2 | Toner 6 | Toner 2 |
| 3 | Toner 3 (4) | Toner 2 |

The above toner combinations showed good color coverage when the voltage of the cell is switched. A square waveform voltage of +/−200V with frequency of 300 mHz was applied across the two ITO coated glass plates, and a distinct contrast was observed as the toner particles migrated back and forth across the cell gap.

Example 3

A dry-powder cell was prepared with ITO glass electrodes coated with silicone sealant spray. White toner particles (Toner 3) and black toner particles (Toner 7) were used in the cell. A voltage of about 80 to about 90 volts was applied across the cell, and an AC field overlay of 80 volts with a frequency of 300 Hertz was applied simultaneously. The cell shows good coverage of the black and white colors as the voltage is switched.

The use of emulsion aggregation particles in an electrophoretic display including emulsion aggregation particles with a surface coating to impart a positive charge to select particles as described herein provides a satisfactory dry-powder electrophoretic display. Improved device performance is realized in that the highly cross-linked toner particles are more resistant to melting and agglomeration as compared to conventional "inks." Additionally, modifying the surface of some toner particles with a surface coating, as described herein, allows for selective tuning of the surface charge to be positive or negative.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A dry-powder electrophoretic display comprising:
   a pair of electrodes disposed opposite one another;
   a spacer layer disposed between the electrodes and defining an air gap therebetween;
   a first set of dry toner particles comprising a plurality of toner particles of a first color and a first charge; and
   a second set of dry toner particles comprising a plurality of toner particles of a second color and a second charge;
   wherein the toner particles of the second sets of dry toner particles comprises a surface coating disposed on the surface of the toner particles, said surface coating comprising a polymer selected from the group of methacrylate polymers and polycarbonate polymers, and imparting a positive charge to the toner particles.

2. The dry-powder electrophoretic display according to claim 1, wherein said surface coating is a methacrylate polymer.

3. The dry-powder electrophoretic display according to claim 2, wherein said methacrylate polymer is a copolymer of butylmethacrylate-(2-dimethylaminoethyl)-methacrylate-methylmethacrylate.

4. The dry-powder electrophoretic display according to claim 3, wherein the ratio of butylmethacrylate:(2-dimethylaminoethyl) methacrylate:methylmethacrylate is about 1:2:1.

5. The dry-powder electrophoretic display according to claim 1, wherein said surface coating is present in an amount of about 1 to about 10% by weight of the toner particles upon which the coating is disposed.

6. The dry-powder eletrophoretic display according to claim 1, wherein said surface coating is present in an amount of from about 3 to about 7% by weight of the toner particles upon which the coating is disposed.

7. The dry-powder electrophoretic display according to claim 1, wherein the toner particles comprising the surface coating have a particle size from about 1 to about 20 microns.

8. The dry-powder electrophoretic display according to claim 3, wherein the toner particles comprising the surface coating have a particle size of from about 1 to about 10 microns.

9. The dry-powder electrophoretic display according to claim 3, wherein the toner particles comprising the surface coating have a particle size of from about 4 to about 7 microns.

10. A dry-powder electrophoretic display comprising:
a cell having a viewed region and a non-viewed region,
a plurality of first toner particles having a first electrical charge, said first toner particles comprising a resin and a colorant; and
a plurality of second toner particles having a second electrical charge, said second toner particles comprising a resin, a colorant and a surface coating disposed on the outer surface of the particles;
wherein said surface coating comprises a methacrylate polymer and imparts a positive charge to the second toner.

11. The dry-powder electrophoretic display according to claim 10, wherein said methacrylate polymer is a copolymer of butylmethacrylate-(2-dimethylaminoethyl)-methacrylate-methylmethacrylate.

12. The dry-powder electrophoretic display according to claim 11, wherein the ratio of butyl methacrylate:(2-dimethylaminoethyl)methacrylate:methylmethacrylate is about 1:2:1.

13. The dry-powder electrophoretic display according to claim 10, wherein said surface coating is present in an amount of about 1 to about 10% by weight of the toner particles upon which the coating is disposed.

14. The dry-powder eletrophoretic display according to claim 10, wherein said surface coating is present in an amount of from about 3 to about 7% by weight of the toner particles upon which the coating is disposed.

15. The dry-powder electrophoretic display according to claim 10, wherein the toner particles comprising the surface coating have a particle size from about 1 to about 20 microns.

16. The dry-powder electrophoretic display according to claim 11, wherein the toner particles comprising the surface coating have a particle size of from about 1 to about 10 microns.

17. The dry-powder electrophoretic display according to claim 11, wherein the toner particles comprising the surface coating have a particle size of from about 4 to about 7 microns.

18. A dry-powder electrophoretic display comprising:
a first electrode;
a second electrode disposed opposite the first electrode;
a spacer layer disposed between the first and second electrodes, the space layer creating an air gap between the first and second electrode;
a first set of toner particles disposed between the first and second electrodes, the first set of toner particles comprising a resin and a colorant, and having a negative charge; and
a second set of toner particles disposed between the first and second electrodes, the second set of toner particles comprising a resin and a colorant, and having a positive charge, wherein the positive charge is produced by the application to the second set of toner particles, a surface coating, in an amount of from about 1 to about 10 percent by weight of the toner particles, formed from a methacrylate polymer comprising a copolymer of butylmethacrylate/(2-dimethylaminoethyl)methacrylate/methylmethacrylate.

19. The dry-powder electrophoretic display according to claim 18, wherein the toner particles of each of the first and second sets of toner particles have a particle size of from about 1 to about 20 microns.

20. The dry-powder electrophoretic display according to claim 18, wherein the toner particles of each of the first and second sets of toner particles have a particle size of about 10 microns or less.

21. The dry-powder electrophoretic display according to claim 18, wherein the surface coating is present in an amount of from about 3 to about 7 percent by weight of the toner particles.

22. The dry-powder electrophoretic display according to claim 18, wherein the ratio of buylmethacrylate to (2-dimethylaminoethyl)methacrylate to methylmethacrylate is about 1:2:1.

23. A process for preparing a dry toner composition for use in a dry-powder electrophoretic display, the process comprising:
forming a first set of dry toner particles comprising a resin and a colorant by an emulsion aggregation process, said first set of dry toner particles having a negative charge; and
forming a second set of dry toner particles comprising a resin latex and a colorant, the second set of dry toner particles being formed by heating a mixture of a latex and a colorant at a temperature of below about the glass transition temperature (Tg) of a polymer contained in the latex; and cooling the mixture;
wherein said second set of dry toner particles is further wet surface treated with a methacrylate polymer by adding a methacrylate polymer solution to the mixture of the latex and colorant subsequent to the cooling of the latex and colorant mixture, and adjusting the pH of the resulting solution to above about 7 thereby permitting the methacrylate polymer to precipitate on the toner particles, said methacrylate polymer providing a positive charge to the surface of the toner particles of the second set of dry toner particles.

24. A process in accordance with claim 23, wherein said methacrylate polymer is a butylmethacrylate-(2-dimethylaminoethyl)methacrylate-methylmethacrylate copolymer (1:2:1) comprising (2-dimethylaminoethyl) methacrylate, butyl methacrylate and methyl methacrylate, the methacrylate polymer having a mean molecular weight, Mw, of from about 125,000 to about 175,000.

25. A process in accordance with claim 23, wherein said methacrylate polymer is present in an amount of from about 1 to about 10 weight percent.

26. A process in accordance with claim 23, wherein said methacrylate polymer is present in an amount of from about 3 to about 7 weight percent.

27. A process in accordance with claim 23, wherein said methacrylate polymer is a butylmethacrylate-(dimethylaminoethyl)methacrylate/methylmethacrylate copolymer present in an amount of from about 1 to about 10 weight percent.

28. A process in accordance with claim 23, wherein said methacrylate polymer is a butylmethacrylate-(dimethylaminoethyl)methacrylate/methylmethacrylate copolymer present in an amount of from about 3 to about 7 weight percent.

29. A process in accordance with claim 23, wherein said pH is from about 8 to about 12.

30. A process in accordance with claim 23, wherein said pH is from about 10 to about 11.

31. A process in accordance with claim 29, wherein the pH of the resulting mixture after heating is from about 2 to about 5 and which pH is increased to from about 9 to about 12 subsequent to the addition of said methacrylate.

32. A process in accordance with claim 29, wherein the pH of the resulting mixture after heating is from about 2 to about 4 and which pH is increased to from about 10 to about 12 subsequent to the addition of said methacrylate.

33. A process in accordance with claim 23, further comprising a second heating at a temperature of about 70° C. to about 95° C. and wherein coalescence results for said latex resin, said colorant and said methacrylate, and which methacrylate is present on the surface of said resulting toner.

* * * * *